United States Patent [19]

Omori et al.

[11] Patent Number: 4,470,390
[45] Date of Patent: Sep. 11, 1984

[54] METHOD AND APPARATUS FOR CONTROLLING AN INTERNAL COMBUSTION ENGINE EQUIPPED WITH A SUPERCHARGER

[75] Inventors: Norio Omori; Masakazu Ninomiya, both of Kariya, Japan

[73] Assignee: Nippondenso Co., Ltd., Kariya, Japan

[21] Appl. No.: 341,503

[22] Filed: Jan. 21, 1982

[30] Foreign Application Priority Data

Jan. 21, 1981 [JP] Japan ................................ 56-8287

[51] Int. Cl.³ ............................................. F02D 23/00
[52] U.S. Cl. ............................. 123/198 F; 123/198 D; 123/333; 123/335; 123/480; 123/481; 60/605; 364/431.04
[58] Field of Search ............. 123/478, 480, 481, 494, 123/198 DB, 198 D, 198 F, 333, 332, 383, 559, 198 DC, 335; 60/601, 603, 605; 364/431.09, 431.05, 431.04

[56] References Cited

U.S. PATENT DOCUMENTS

| | | | |
|---|---|---|---|
| 3,756,205 | 9/1973 | Frost | 123/481 |
| 4,044,560 | 8/1977 | Dorsch et al. | 60/603 |
| 4,354,239 | 10/1982 | Kanegae | 364/431.05 |
| 4,375,207 | 3/1983 | Sieber et al. | 123/198 DB |

FOREIGN PATENT DOCUMENTS

| | | | |
|---|---|---|---|
| 55-98626 | 7/1980 | Japan | 60/603 |
| 1277020 | 6/1972 | United Kingdom | 123/198 DB |

Primary Examiner—Andrew M. Dolinar
Attorney, Agent, or Firm—Cushman, Darby & Cushman

[57] ABSTRACT

Supercharging pressure produced by a supercharger driven by the exhaust gasses is detected so that frequency of combustion in an internal combustion engine is reduced to lower the engine output power. In order to reduce the frequency of combustion, the number of times of fuel injection may be thinned out or fuel injection into one or some of the cylinders of the engine may be stopped for a given period of time. Alternatively, the frequency of ignition may be reduced or ignition in one or some of the cylinders may be stopped for a given period of time. The control of fuel injection and the control of ignition may be combined. A microcomputer may be used to perform the method according to the present invention where the microprocessor thereof is arranged to execute a main routine and an interrupt service routine. In the main routine, data related to the supercharging pressure is stored in a memory, and the interrupt service routine, fuel injection and/or ignition is performed. The prestored data is read out in the interrupt service routine to control fuel injection and/or ignition when supercharging pressure is above a given value.

13 Claims, 9 Drawing Figures

METHOD AND APPARATUS FOR CONTROLLING AN INTERNAL COMBUSTION ENGINE EQUIPPED WITH A SUPERCHARGER

BACKGROUND OF THE INVENTION

This invention generally relates to internal combustion engines with a supercharger, and more particularly, the present invention relates to a method of controlling engine operation by preventing the pressure of supercharged intake air from being increased beyond a given value.

In an internal combustion engine equipped with a supercharger of the type driven by the exhaust gasses, the greater amount of the exhaust gasses the higher supercharging pressure is produced. However, supercharging pressure should be limited within a given value because excessively high pressure may damage the engine. According to one conventional system for suppressing such an excessive increase in supercharging pressure, the amount of exhaust gasses passing through the turbine of the supercharger is controlled so that the rotational speed of the turbine is suppressed within a predetermined limit. This conventional system or method has suffered from various problems. Namely, the system is too complex, and therefore, expensive. Furthermore, since the conventional system has to control the amount of exhaust gasses under high temperature conditions, the system has a problem in connection with durability.

SUMMARY OF THE INVENTION

This invention has been developed in order to remove the above-mentioned disadvantages and drawbacks inherent to the conventional systems or methods.

It is, therefore, an object of the present invention to provide a method of controlling an internal combustion engine equipped with a supercharger so that supercharging pressure can be lowered when it exceeds a predetermined value, while stalling does not occur in a motor vehicle having the engine.

According to the present invention the number of times of combustions per unit time is decreased in order to lower the supercharging pressure. Decrease in combustion number will results in decrease in output power of the engine, and therefore, the rotational speed of the turbine will decrease.

In accordance with the present invention there is provided a method of controlling an internal combustion engine equipped with a supercharger of the type driven by the exhaust gasses from said engine, comprising the steps of: detecting supercharging pressure to produce a signal indicating that the supercharging pressure is above a predetermined value; and reducing the number of times of combustion in said engine per unit time in the presence of said signal.

In accordance with the present invention there is also provided apparatus for controlling combustion in an internal combustion engine equipped with a supercharger of the type driven by the exhaust gasses of said engine, comprising: first means for detecting the pressure of supercharging pressure and producing an output signal; second means for calculating the amount of fuel to be injected into the cylinders of said engine in accordance with engine parameters; third means for supplying said engine with fuel in accordance with information from said second means; fourth means for controlling said third means in response to said output signal from said first means so that fuel supply is controlled when the supercharging pressure is above a predetermined value for lowering the engine output.

In accordance with the present invention there is further provided apparatus for controlling combustion in an internal combustion engine equipped with a supercharger of the type driven by the exhaust gasses of said engine, comprising: first means for detecting the pressure of supercharging pressure and producing an output signal; second means for calculating the ignition timing in accordance with engine parameters; third means for igniting air/fuel mixture supplied to the cylinders of said engine in accordance with information from said second means; fourth means for controlling said third means in response to said output signal from said first means so that ignition is controlled when the supercharging pressure is above a predetermined value for lowering the engine output.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE INVENTION

Figure 1:
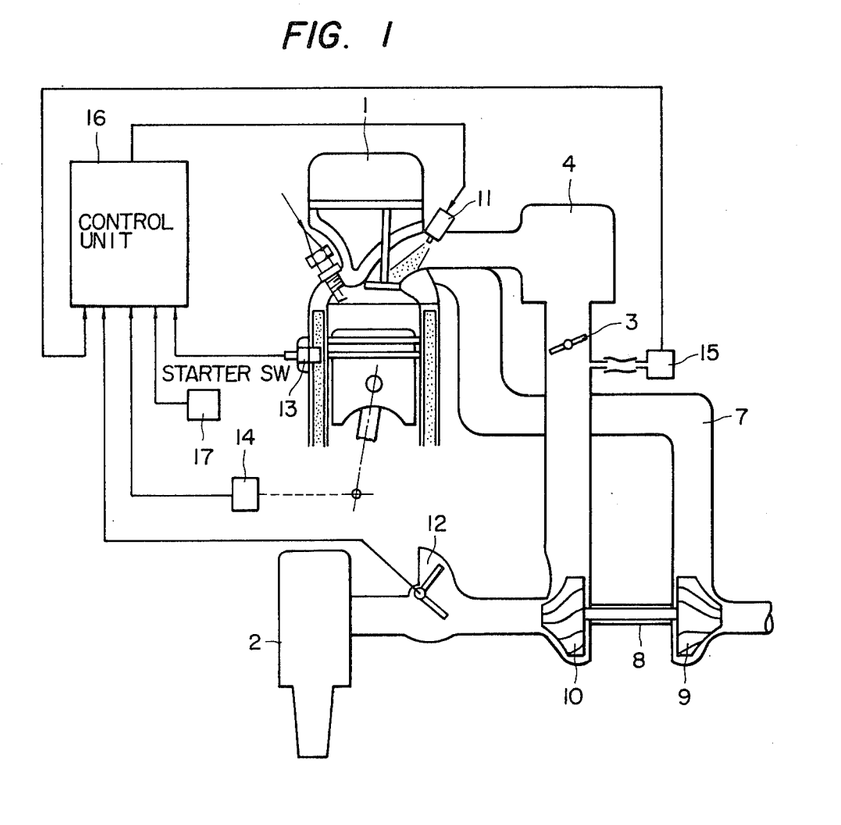
FIG. 1 is a schematic diagram of an internal combustion engine equipped with a supercharger, with which diagram a first embodiment of the present invention will be described.

FIG. 1 shows a diagram of an internal combustion engine equipped with a supercharger. The internal combustione engine 1 is of a well-known 4-cycle spark-ignition type. The engine 1 is arranged to suck intake air via an air cleaner 2, a throttle valve 3 and a surge chamber 4, and to emit exhaust gasses via an exhaust pipe 7. The exhaust gasses rotates a turbine wheel 9 of a supercharger 8 before emitted to the atmosphere. The supercharger has a compressor wheel 10 driven by the turbine wheel 9 so that the intake air is compressed and is supercharged into the cylinders of the engine 1. Fuel of the engine 1 is fed from an unshown fuel supply system via electromagnetic fuel injection valves 11 provided for respective cylinders, to the cylinders. In the intake system, an intake air amount or flow rate sensor 12 is disposed downstream of the air cleaner 2. The intake air flow rate sensor 12 comprises a potentiometer which produces an analog voltage indicative of the flow rate of the intake air sucked into the engine cylinders.

A coolant temperature sensor 13 of thermister type which produces an analog volage indicative of the coolant temperature, is provided to the engine 1. A rotational speed sensor 14 is arranged to produce a pulse train signal having a frequency indicative of the rotational speed of the crank shaft of the engine 1. A contact breaker of an ignition coil of the ignition system of the engine 1 may be used as the rotational speed sensor 14. Namely, ingition pulse signal from the primary side terminal of the ignition coil may be used as a rotational speed indication signal.

A pressure switch 15 is arranged to turn on when the supercharging pressure produced by the compressor wheel 10 is over a predetermined value. A control unit 16 responsive to the output signals from the above-mentioned various sensors 12 to 14 is provided. The control unit 16 controls the operation of the fuel injection valves 11 so that opening time length of each fuel injection valve 11 is controlled in accordance with various information from the sensors 12 to 14 as will be described in detail hereinbelow.

Figure 2:
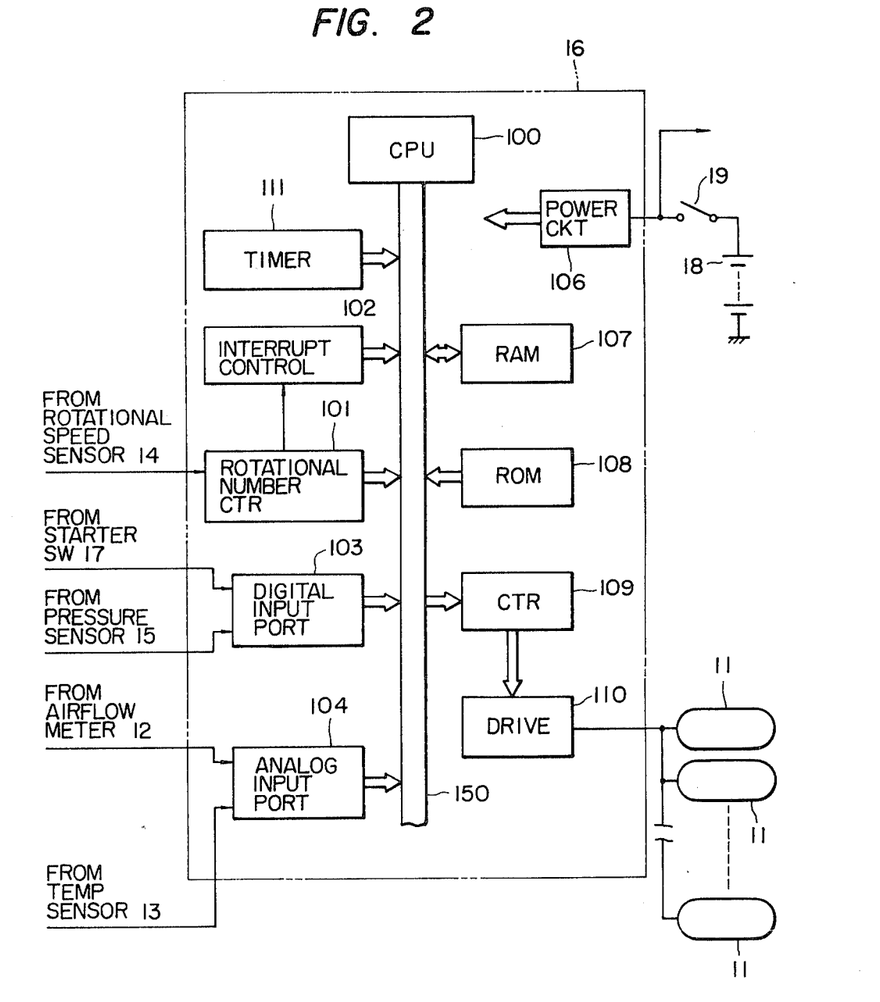
FIG. 2 is a schematic block diagram of the control unit shown in FIG. 1.

FIG. 2 illustrates a schematic block diagram of the control unit 16. The reference numeral 100 is a microprocessor or central processing unit (CPU) which calculates the amount of fuel to be injected, reference 101 is a rotational number counter for counting the number of pulses from the rotational speed sensor 14. Namely, the rotational number counter 101 counts the number of revolutions of the internal combustion engine 1 per unit time. The rotational number counter 101 sends an interrupt instruction to an interrupt control circuit 102 once per two revolutions of the engine 1 in a synchronized manner. The interrupt control circuit 102 supplies the microprocessor 100 with an interrupt signal through a common bus 150 in response to the interrupt instruction. The reference 103 is a digital input port for receiving digital binary signals, such as a starter signal from a starter switch 17 which controls ON and OFF of an unshown starter, and an ON/OFF signal from the pressure switch 15, and these signals are then fed to the microprocessor 100. The reference 104 is an analog input port having an analog multiplexer and an analog-to-digital (A/D) converter. The analog input port 104 receives signals from the intake air flow rate sensor 12 and the coolant temperature sensor 13 so that data indicative of these variables is read by the microprocessor 100.

The output information from the above-mentioned various units 101, 102 and 103 is transmitted via the common bus 150 to the microprocessor 100. The reference 18 is a battery, and a power supply circuit 106 is connected via a key switch 19 to the battery 18. The reference 107 is a temporary memory unit (RAM) used temporarily during operation of a program, while the reference 108 is a read-only memory (ROM) for storing a control program and various constants.

A counter 109 including a down counter and registers is provided for producing pulse signals, the pulse width of which corresponds to the amount of fuel to be supplied to the engine 1. The counter 109 is coupled via the common bus 150 to the microprocessor 100 for receiving digital signals indicative of the amount of fuel which should be fed to the engine 1. Namely, the counter 109 converts its digital input into a pulse train signal, the pulse width of which is varied by the digital input, so that fuel injection valves 11 are successively energized for an interval defined by the pulse width to inject fuel into the intake manifold of the engine 1. The pulse train signal produced in the counter 109 is then applied to a driving stage 110 for producing a driving current with which the fuel injection valves 11 are energized successively.

A timer circuit 111 is connected via the common bus 150 to the microprocessor 100 for supplying the same with information of lapse of time measured.

The rotational number counter 101 produces the aforementioned interrupt instruction at the end of each measurement, and sends the same to the interrupt control circut 102. The interrupt control circuit 102 produces an interrupt signal in response to the interrupt instruction to cause the microprocessor 100 to execute an interrupt service routine in which the amount of fuel to be injected is calculated.

Figure 3:
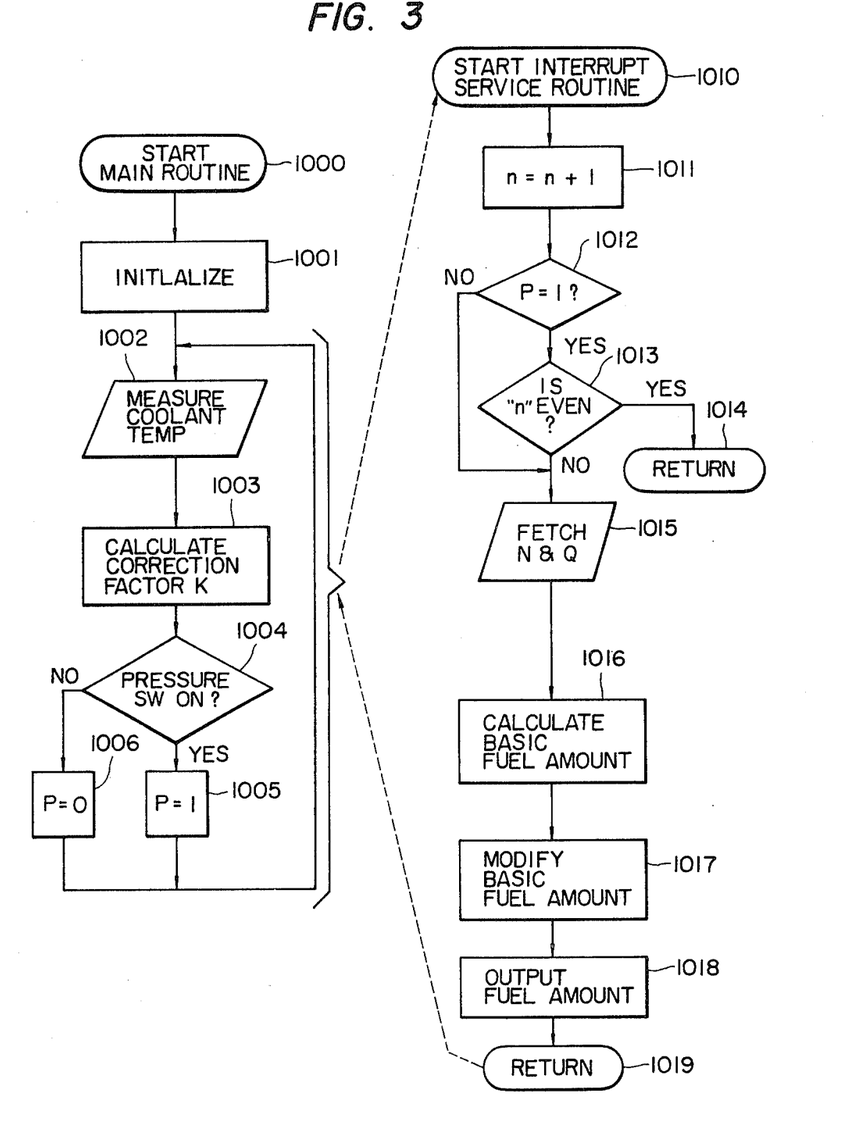
FIG. 3 is a flowchart showing the operational sequence in the control unit of FIG. 2.

FIG. 3 is a schematic flowchart showing the operation of the microprocessor 100, and the function of the microprocesor 100 will be described with reference to this flowchart. When the key switch 19 and the starter switch 17 are turned on to start the engine 1, the operation of the main routine will be executed from a starting step 1000. In a first step 1001, initialization is performed. In a following second step 1002, digital values indicative of the coolant temperature is fetched from the analog input port 104. In a third step 1003, a correction factor K, which will be described later, is calculated in accordance with the coolant temperature. The result of the calculation is then stored in the RAM 107. In a fourth step 1004, it is detected whether the pressure switch 15 is ON or OFF from a digital value indicative of the ON or OFF state of the pressure switch 15. When the pressure switch 15 is ON, the answer of the step 1004 is YES, and in this case, the operational flow branches off so that a step 1005 takes place. In this step 1005, a flag P is set to logic "1" (P=1), and this is stored in the RAM 107. On the other hand, if the pressure switch 15 is OFF, the answer of the step 1004 is NO, and in this case, the operational flow branches off so to a step 1006. In this step 1006, a flag P is set to logic "0" (P=0), and this is stored in the RAM 107. Normally, the main routine is executed repeatedly in accordance with the control program from the step 1001 to the step 1005 or from the step 1001 to the step 1006.

When an interrupt signal for the calculation of the amount of fuel to be injected is applied from the interrupt control circuit 102, the microprocessor 100 immediately discontinues its operation even if the microprocessor is in the middle of execution of the main routine, so that the interrupt service routine will be executed from a starting step 1010 thereof. In a first step 1011 of the interrupt service routine, a number "n" is added by one each time the interrupt service rountine is executed and the result of addition (n=n+1) is stored in the RAM 107. In a following step 1012, the flag P indicative of the state of the pressure switch 15 is read out to check whether P is 1 or not. When P=1, namely, when the supercharging pressure is above the predetermined value, the answer of the step 1012 branches off to YES in order to lower the output power of the engine 1 by thinning out the number of times of fuel injection in such a manner that fuel injection is performed at every other normal times. In a following step 1013, it is detected whether the value of "n" prestored in the RAM 107 is even or not. If "n" is even, the answer of the step 1013 branches off to YES to to to a step 1014 so as to return to the main routine. In the case of returning to the main routine, the operational flow returns to a processing step at which interruption has occurred.

On the contrary, in the case that "n" is odd in the step 1013, a step 1015 takes place. Turning back to the step 1012, if the supercharging pressure is detected to be low by the pressure switch 15, namely, when P=0, the step 1012 branches off to NO so that the step 1015 takes place irrespective of even or odd state of "n". In the step 1015, a signal indicative of the rotational speed N of the engine 1 is fetched from the rotational number counter 101, and also a signal indicative of the amount of intake air Q is fetched from the anolog input port 104. In a following step 1016, a basic amount of fuel to be injected, i.e. the time length for which fuel is injected, which is determined by the rotational speed N of the engine 1 and the amount of intake air Q, is calcuated. A formular used for this calculation is given by:

$$t = F \times Q/N$$

wherein F is a constant.

In a following step 1017, the aforementioned fuel injection time length correction factor K, which has been obtained in the main routine, is read out from the RAM 107 so that the amount of fuel to be injected, i.e. the injection time length T, determining the air/fuel ratio, will be calculated. A formula used for calculating the injection time length T is given by:

$$T = t \times K$$

In a step 1018, the result of the above corrective calculation is set into the counter 109 so that information indicative of actual length of time of fuel injection is given to the counter 109. Then the operational flow enters into a step 1019 to return to the main routine.

Figure 4:
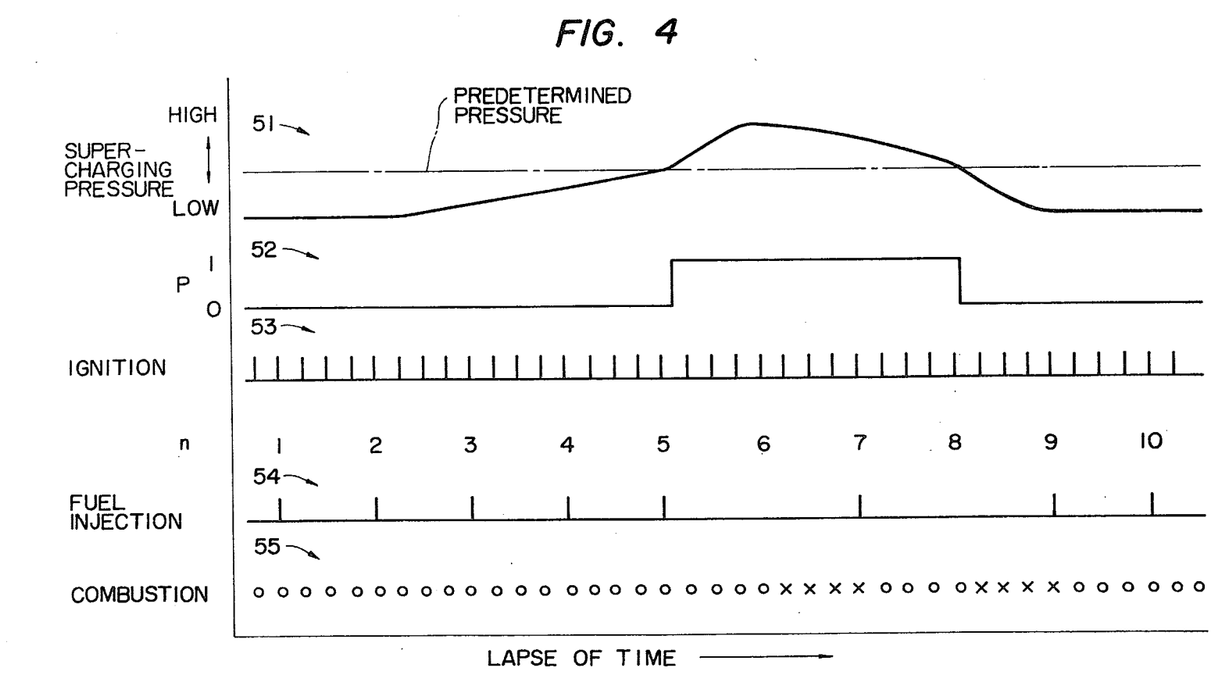
FIG. 4 is a timing chart useful for understanding the operation of the engine of FIG. 1.

FIG. 4 is a timing chart showing the operational condition of the internal combustion engine 1 to which the method according to the present invention is adapted. In FIG. 4, the reference 51 indicates the supercharging pressure; 52, the state of the pressure switch 15; 53, ignition timing; 54, fuel injection state; and 55, state of combustion in the engine 1. In the example of FIG. 4, it is assumed that the supercharging pressure is below a predetermined value at the beginning so that fuel injection is normally performed. Then the supercharging pressure is increased as indicated by the rising curve 51. When the value of the curve 51 exceeds the predetermined value indicated by a dot-dash line, the pressure switch 15 turns on, that is P=1. Under this condition of P=1, when the value of "n" indicative of the number of times of interruption is even, namely, when "n" is 6 or 8, in the illustrated example, fuel injection is not performed. Since no fuel injection is effected at the points of n=6 and n=8, combustion does not take place for intervals respectively following the points of no fuel supply. In detail, combustion does not take place for four times from the points of n=6 and n=8. In FIG. 4, circles and Xs respectively indicate combustion occurred as a result of fuel supply and noncombustion occurred as a result of no fuel supply. Since the number of times of combustion is reduced as described in the above, the output power of the engine 1 lowers. Accordingly the supercharging pressure lowers as indicated by the curver 51, and when the pressure falls below the predetermined value, the pressure switch 15 opens (P=0). Therefore, after the point of n=9, normal fuel injection is performed.

Although the number of times of fuel injection is reduced to one half of that of normal condition to lower the engine output power when the supercharging pressure is above a predetermined value in the above-described embodiment, the number of times of fuel injection may be reduced to one third, one fourth or the like. Namely, in the above-described first embodiment, the frequency of fuel injection is lowered or reduced to an extent so that engine output power decreases to lower the supercharging pressure.

Figure 5:
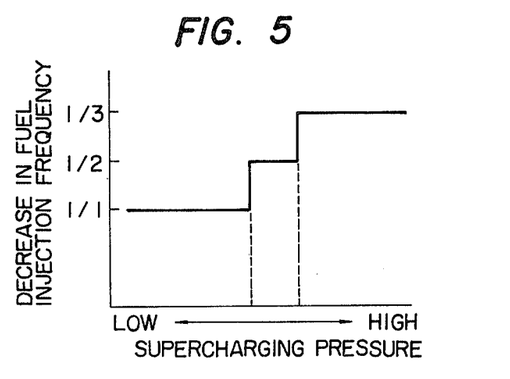
FIG. 5 is a graph showing a thinned-out operation of fuel injection in a second embodiment of the present invention.

FIG. 5 is a graphical representation showing the relationship between the supercharging pressure and the number of times of fuel injection. As illustrated in FIG. 5, in a second embodiment of the present invention, the degree of reduction in the number of times of fuel injection is varied in accordance with the value of the supercharging pressure. In order to control the fuel injection times in this way, a sensor producing an output signal indicative of the supercharging pressure may be employed so that fuel injection control can be stepwisely effected.

Figure 6:
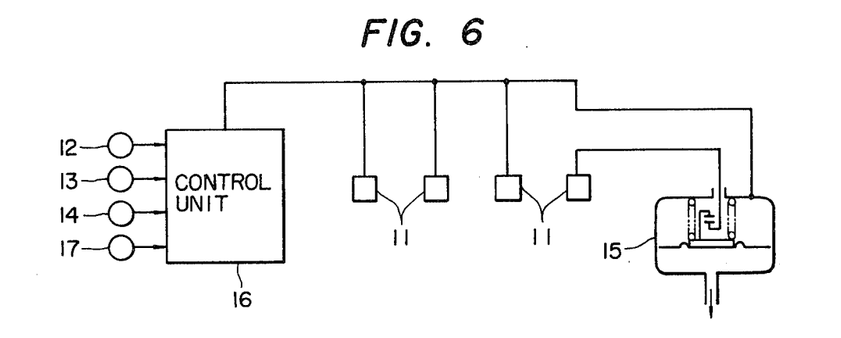
FIG. 6 is a partial diagram showing a third embodiment of the present invention.

A third embodiment of the present invention will be described with reference to FIG. 6 which shows a portion different from FIG. 1. The reference numeral 15 is a pressure switch arranged to open its contacts 15c to assume OFF state when the supercharging pressure is below a predetermined value, and to close its contacts 15c to assume ON state when the pressure is above the same. The control unit 16 calculates the opening time length of the fuel injection valves 11 to energize the fuel injection valves 11 accordingly. One of the fuel injection valves 11 is connected via the contacts 15c of the pressure switch 15 to the control unit 16, while remaining fuel injection valves 11 are directly connected to the control unit 16 in the same manner as in the first embodiment. Therefore, when the supercharging pressure exceeds the predetermined value, one of the fuel injection valves 11 is deenergized to stop injection. As a result, the engine output power can be lowered to lower the supercharging pressure accordingly. Although it is illustrated that fuel cut off is effected in connection with only one of the fuel injection valves 11, the number of fuel injection valves whose operation is controlled by the pressure switch 15 may be increased if desired.

In the above-described embodiments, the engine output power is lowered by reducing the number of times or frequency of fuel injection or by stopping injection into a given cylinder of the engine 1. However, similar effect may be obtained by reducing the number of times of ignition or by stopping ignition in a given cylinder. In other words, fuel supply control can be substituted with ignition control to lower the supercharging pressure because combustion does not occur in the absence of fuel or ignition.

Figure 7:
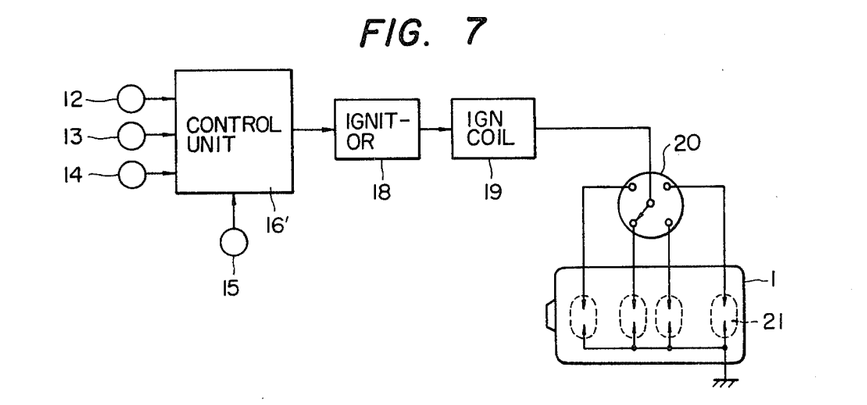
FIG. 7 is a partial diagram showing a fourth embodiment of the present invention.

A fourth embodiment which actualizes the abovementioned ignition control will be described with reference to FIG. 7. The reference 16' is a control unit which calculates ignition timing on the basis of the rotational speed N, the intake air amount Q and the coolant temperature. An ignitor 19 responsive to the output signal from the control unit 16' intermittently cut the primary current of an ignition coil 19 having a secondary winding connected to a distributer 20 which distributes a high tension current to the spark plugs 21 of the engine 1. The processing steps in the control unit 16' are similar to those of FIG. 3, and only a different portion, i.e. steps 1016' to 1018', will be described with reference to FIG. 8. The interrupt service routine is executed at every ignition, and in a step 1016' following the step 1015 of FIG. 3, a basic ignition timing prestored in a ROM corresponding to the ROM 108 of FIG. 2 is obtained on the basis of the rotational speed N and the intake air amount Q. In a following step 1017', the read out basic ignition timing is midified by an ingition timing correction factor K', and the modified or corrected ignition timing is then set in a counter in a following step 1018'. After this, the operational flow returns via the step 1019 to the main routine. With this operation, the number of times of ignition is thinned out or reduced by half compared to the ignition under normal condition when the supercharging pressure exceeds the predetermined value. Namely, the frequency of ignition is lowered or reduced so that frequency of combustion lowers.

Figure 8:
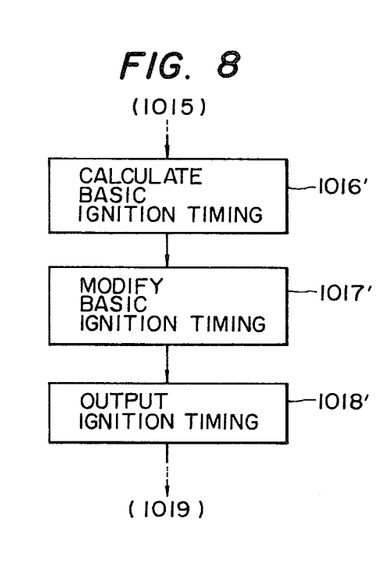
FIG. 8 is a partial flowchart showing the operating sequence in the fourth embodiment of the present invention.
Figure 9:
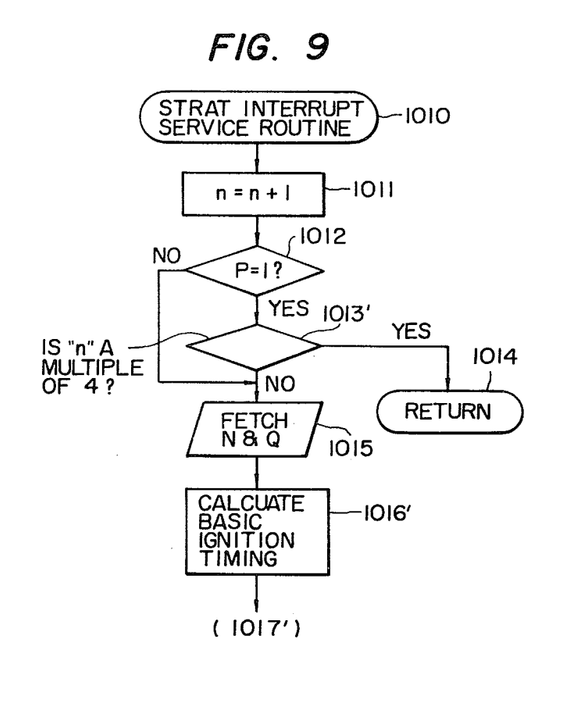
FIG. 9 is a partial flowchart showing the operating sequence in a fifth embodiment of the present invention.

FIG. 8 is a flowchart showing a fifth embodiment of the present invention, and shows only a portion different from the above-described fourth embodiment. In this embodiment, the interrupt service routine is executed at every ignition in order to stop ignition in a given cylinder, and in a step 1013', it is detected whether the value of "n" is an integral multiple of 4 or not in the case of an engine having four cylinders. Therefore, ignition is skipped at every four ignition timings resulting in no ignition in a given cylinder. The fifth embodiment will be actualized by a similar system to that shown in FIG. 7.

In the first to the fifth embodiments described in the above, although a microcomputer dealing with digital values is used to construct the control unit, an analog computer may also be used to perform similar controls.

In the embodiments in which ignition is stopped, it is preferable to also stop fuel injection simultaneously for preventing unburnt mixture from being emitted from the exhaust pipe.

The above-described embodiments are just examples of the present invention, and therefore, it will be apparent for those skilled in the art that many modifications and variations may be made without departing from the spirit of the present invention.

What is claimed is:

1. A method of controlling an internal combustion engine equipped with a supercharger of the type driven by the exhaust gasses from said engine, comprising the steps of:
   (a) detecting supercharging pressure to produce a signal indicating that the supercharging pressure is above a predetermined value; and
   (b) reducing the number of times of combustion in said engine per unit time in the presence of said signal for preventing combustion for a first predetermined number of times during at least one of successive predetermined intervals so that the number of actual combustion times during said at least one predetermined interval equals a predetermined fraction of a total predetermined number of times of combustion carried out during one of said predetermined intervals before said reducing.

2. A method as claimed in claim 1, wherein said step of reducing comprises a step of thinning out a number of times of fuel injection into said engine.

3. A method as claimed in claim 1, wherein said step of reducing comprises a step of stopping fuel injection into at least one cylinder of said engine.

4. A method as claimed in claim 1, wherein said step of reducing comprises a step of thinning out a number of times of ignition in cylinders of said engine.

5. A method as claimed in claim 1, wherein said step of reducing comprises a step of stopping ignition in at least one cylinder of said engine.

6. A method as claimed in claim 2, wherein the thinning out step comprises processing steps in a computer arranged to operate in accordance with a program having a main routine and an interrupt service routine,
   said main routine having a step of storing into a memory a signal indicating that the supercharging pressure is above a predetermined value,
   said interrupt service routine being executed periodically for determining the amount of fuel to be supplied to said engine and for supplying said engine with fuel accordingly,
   said interrupt service routine having a step of interrupting said interrupt service routine so that fuel supply is not effected in the presence of said signal indicating that the supercharging pressure is above said predetermined value.

7. A method as claimed in claim 4, wherein the thinning out step comprises processing steps in a computer arranged to operate in accordance with a program having a main routine and an interrupt service routine, said main routine having a step of storing into a memory a signal indicating that the supercharging pressure is above a predetermined value, said interrupt service routine being executed periodically for determining the ignition timing and for igniting air/fuel mixture in the cylinders of said engine accordingly, said interrupt service routine having a step of interrupting said interrupt service routine so that ignition is not effected in the presence of said signal indicating that the supercharging pressure is above said predetermined valve.

8. Apparatus for controlling combustion in an internal combustion engine equipped with a supercharger of the type driven by the exhaust gasses of said engine, comprising:
   (a) first means for detecting supercharging pressure and producing an output signal indicative of said supercharging pressure;
   (b) second means for calculating the amount of fuel to be injected into cylinders of said engine in accordance with engine parameters;
   (c) third means for supplying said engine with fuel in accordance with information from said second means; and
   (d) fourth means for controlling said third means in response to said output signal from said first means so that fuel supply is controlled when the supercharging pressure is above a predetermined value for lowering the engine output, said fourth means operating such that fuel injection is not performed for a first predetermined number of times during at least one of successive predetermined intervals so that the number of actual fuel injection times during said at least one predetermined interval equals a predetermined fraction of a total predetermined number of times of fuel injection carried out during one of said predetermined intervals before said controlling.

9. Apparatus as claimed in claim 8, wherein said fourth means comprises means for reducing the frequency of fuel supply.

10. Apparatus as claimed in claim 8, wherein said fourth means comprises means for disabling a portion of said third means so that at least one but not all of the cylinders of said engine receives no fuel for a given period of time.

11. Apparatus for controlling combustion in an internal combustion engine equipped with a supercharger of the type driven by the exhaust gasses of said engine, comprising:
   (a) first means for detecting supercharging pressure and producing an output signal indicative of said supercharging pressure;
   (b) second means for calculating the ignition timing in accordance with engine parameters;
   (c) third means for igniting air/fuel mixture supplied to cylinders of said engine in accordance with information from said second means;
   (d) fourth means for controlling said third means in response to said output signal from said first means so that ignition is controlled when the supercharging pressure is above a predetermined value for lowering the engine output, said fourth means operating such that said igniting of said air/fuel mixture is not performed for a first predetermined number of times during at least one of successive predetermined intervals so that the number of actual igniting times during said at least one predetermined interval equals a predetermined fraction of a total predetermined number of times of igniting carried out during one of said predetermined intervals before said controlling.

12. Apparatus as claimed in claim 11, wherein said fourth means comprises means for reducing the frequency of ignition.

13. Apparatus as claimed in claim 11, wherein said fourth means comprises means for desabling a portion of said third means so that ignition does not take place in at least one of the cylinders of said engine for a given period of time.

* * * * *